No. 750,340. PATENTED JAN. 26, 1904.
F. BISSING.
HOSE PIPE FASTENER.
APPLICATION FILED MAR. 3, 1903.
NO MODEL.
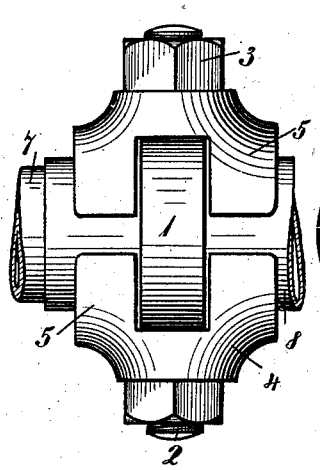
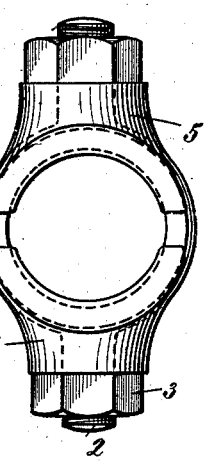
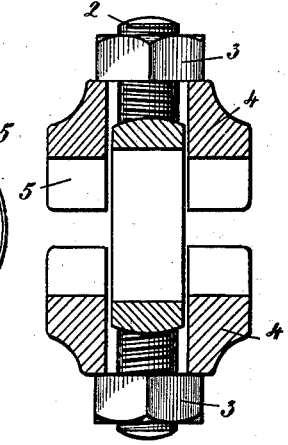
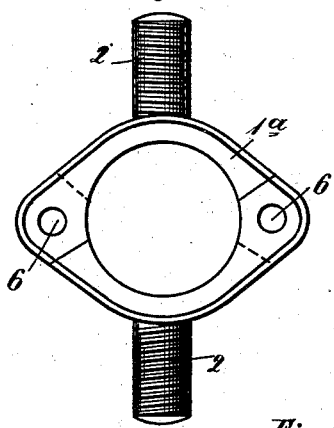
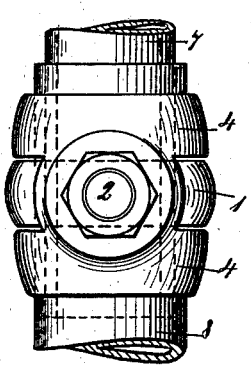
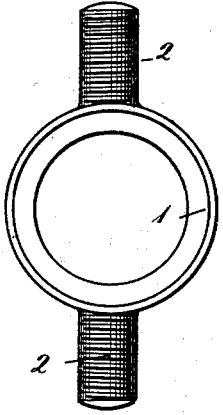
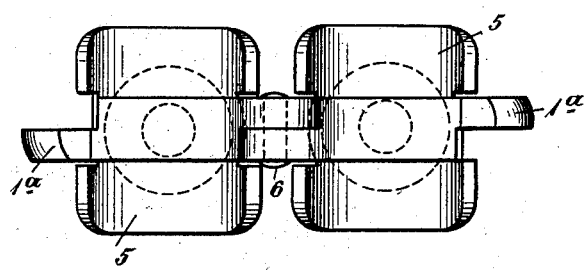

No. 750,340.

Patented January 26, 1904.

UNITED STATES PATENT OFFICE.

FRITZ BISSING, OF KREUZLINGEN, SWITZERLAND.

HOSE-PIPE FASTENER.

SPECIFICATION forming part of Letters Patent No. 750,340, dated January 26, 1904.

Application filed March 3, 1903. Serial No. 146,110. (No model.)

*To all whom it may concern:*

Be it known that I, FRITZ BISSING, a citizen of the German Empire, residing at Kreuzlingen, Switzerland, have invented certain new and useful Improvements in Hose-Pipe Fasteners, of which the following is a description, reference being had to the accompanying drawings and to the figures of reference marked thereon.

The method hitherto employed for connecting hose-pipes on separate hose nozzles, sockets, pipes, or the like by means of binding-wire has various drawbacks. In twisting round the ends of the wire it easily breaks, and when the wire is pulled too tight it very easily cuts into the hose-pipe in such a way as to do considerable damage and necessitate having to cut off the ends of and shortening the expensive hose-pipe.

This invention relates to an extremely simple means for obviating these drawbacks and for producing a tight fitting for a hose-pipe or the like on hose-pipe couplings, pipes, or the like.

The device consists of a round yoke provided with threaded bolts lying diametrically opposite one another. The jaws press the elastic hose-pipe in the direction of the screw-bolts—that is to say, at diametrically opposite places against the pipe. The hose tends to bulge out laterally at the places lying between, and thus presses itself against the yoke, fitting tightly on the hose-pipe, thereby producing a tight joint all round on the pipe and being retained thereon.

The object of the invention is shown in the accompanying drawings in Figures 1 to 7.

Figs. 1, 2, and 5 are various elevations of the hose-pipe fastening. Fig. 3 is a longitudinal section of same. Fig. 6 shows the yoke alone, and Figs. 4 and 7 a yoke composed of two parts adapted to be turned back or opened for cases where the hose-pipe fastener for any reason cannot be passed over the hose and pipe in an axial direction.

The hose-pipe fastener consists of a yoke 1, formed in one piece, or a yoke $1^a$, consisting of two parts adapted to be opened or folded back, but firmly attached to one another, and the yoke is provided with threaded bolts 2 at diametrically opposite places, Figs. 4, 6, and 7. The yoke 1 or $1^a$ is passed over a hose-pipe 8 which has been fitted on a pipe 7, and by means of the nuts 3 jaws 4 are pressed against the hose-pipe. These jaws are recessed in the center in order to give room for the yoke 1 and are provided at both sides with flaps or lugs 5, recessed semicircularly or approximately so, the lugs being so constructed that their ends will nearly meet when the jaws are pressed together. Owing to the jaws 4 being pressed on, the elastic hose-pipe tends to bulge out between the two jaws or lugs 5 and is thereby pressed firmly against the inner sides of the yoke 1 at the places in question. The hose-pipe is consequently pressed on the tube all round and forms a very tight joint on the tube, even under very high pressure. The tube may be made smooth or provided with rings, as is usual in hose-couplings.

If the hose-pipe fastener can be drawn or passed axially over the hose-pipe, a yoke 1, formed in one piece, suffices; but if for any reason it is not possible to pass the fastener over the hose-pipe and it becomes necessary to push the fastener radially over the pipe then the yoke $1^a$, formed of two parts hinged together and adapted to be folded back or opened and which are held together at the hinge-point by means of pins 6, splints, or the like, is preferably employed, Figs. 4 and 7. It is evident that instead of screw-bolts and nuts for pressing on the press-jaws 4 in the ordinary manner wedges, eccentrics, cams, or the like may be employed. Under certain circumstances it may also be preferable to employ two hose-pipe fasteners side by side in order to produce a tight joint between the hose pipe or tube on which it is mounted.

Having now particularly described and ascertained the nature of my said invention and in what manner the same is to be performed, I declare that what I claim is—

A hose-pipe fastener comprising a round yoke provided with threaded bolts or the like arranged diametrically opposite one another which yoke is formed in separable sections to adapt it to be opened and passed laterally over the hose-pipe, and semicircular or approximately semicircular jaws which are pressed on the hose-pipe by means of said bolts which jaws press the elastic hose-pipe firmly against and laterally on both sides of the pipe both in proximity to the yoke and also between the two jaws thereby insuring a thoroughly tight joint between the hose-pipe and the pipe.

In testimony whereof I affix my signature in presence of two witnesses.

FRITZ BISSING.

Witnesses:
A. B. DRANTZ,
R. STOERZBACH.